US008161727B2

(12) United States Patent
Bart et al.

(10) Patent No.: US 8,161,727 B2
(45) Date of Patent: Apr. 24, 2012

(54) SYSTEM PROVIDING BRAKING IN A GAS TURBINE ENGINE IN THE EVENT OF THE TURBINE SHAFT BREAKING

(75) Inventors: Jacques Rene Bart, Soisy sur Seine (FR); Didier Rene Andre Escure, Nandy (FR); Claude Marcel Mons, Savigny le Temple (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 1001 days.

(21) Appl. No.: 12/126,648

(22) Filed: May 23, 2008

(65) Prior Publication Data

US 2009/0126336 A1 May 21, 2009

(30) Foreign Application Priority Data

May 25, 2007 (FR) ...................................... 07 03758

(51) Int. Cl.
*F02K 9/38* (2006.01)
*F02G 3/00* (2006.01)
*F03D 11/02* (2006.01)

(52) U.S. Cl. ........................ 60/223; 60/39.091; 415/123

(58) Field of Classification Search ............... 60/39.091, 60/223, 226.1, 39.163; 415/123, 122.1
See application file for complete search history.

(56) References Cited

U.S. PATENT DOCUMENTS 3,490,748 A * 1/1970 Hoffman ........................... 415/9
4,498,291 A 2/1985 Jeffery et al.
4,735,975 A * 4/1988 Iwata et al. ................... 523/152
4,799,354 A * 1/1989 Midgley .......................... 60/788
5,029,439 A * 7/1991 Berneuil et al. ........... 60/39.091
6,312,215 B1 * 11/2001 Walker .............................. 415/9
7,225,607 B2 * 6/2007 Trumper et al. ................ 60/223
2003/0233822 A1 * 12/2003 Albrecht et al. ........... 60/39.091
2006/0042226 A1 3/2006 Trumper et al.

FOREIGN PATENT DOCUMENTS

EP 0 374 003 A1 6/1990
EP 0 928 881 A1 7/1999
FR 2.050.550 4/1971

OTHER PUBLICATIONS

U.S. Appl. No. 12/126,407, filed May 23,2008, Bart, et al.

* cited by examiner

*Primary Examiner* — Ehud Gartenberg
*Assistant Examiner* — Gerald Sung
(74) *Attorney, Agent, or Firm* — Oblon, Spivak, McClelland, Maier & Neustadt, L.L.P.

(57) ABSTRACT

A device for, in a gas turbine engine, braking a turbine including a rotor driving a shaft capable of rotating with respect to a stator in the event of said shaft breaking is disclosed. The device includes a first braking member provided with at least one abrasive element and a second braking member including a ring-shaped element (120A) made of a material capable of being eroded by the abrasive element. One of the two braking members being secured to the rotor and the other of the two braking members being secured to the stator. The braking members come into contact with one another through axial displacement of the rotor once the shaft has broken. The abrasive element of the first braking member eroding the ring-shaped element of the second braking member.

9 Claims, 2 Drawing Sheets

SYSTEM PROVIDING BRAKING IN A GAS TURBINE ENGINE IN THE EVENT OF THE TURBINE SHAFT BREAKING

BACKGROUND OF THE INVENTION

The present invention relates to the field of gas turbine engines and, in particular, that of multiple flow turbojet engines and relates to a system that, in the event that a shaft of the machine breaks, allows the machine to be stopped in the shortest possible time.

In a multiple flow turbofan jet engine, the fan is driven by the low-pressure turbine. When the shaft connecting the fan rotor to the turbine rotor breaks, the resistive torque on the turbine is suddenly removed although the flow of driving gas continues to transmit its energy to the rotor. This results in a rapid increase in the rotational speed of the rotor which is liable to reach the limit that it can withstand and shatter, with the ensuing catastrophic consequences that this has.

DESCRIPTION OF THE PRIOR ART

It has been proposed that the supply of fuel to the combustion chamber be interrupted in order to eliminate the source of energy via which the rotor is accelerated. One solution is to monitor the rotational speed of the shafts using redundant measurement means and to command an interruption in the supply of fuel when overspeed is detected. According to U.S. Pat. No. 6,494,046, the rotational frequencies are measured at the two ends of the shaft at the bearings and these are continuously compared in real time.

Means for braking the rotor when such an incident occurs have also been proposed. The axial displacement of the rotor following breakage of the shaft triggers the actuation of mechanisms aimed at dissipating the kinetic energy of this. These are, for example, fixed fins of the adjacent guide vane assembly which are tilted toward the rotor blades in order to position themselves between these blades and cross their paths. The kinetic energy is dissipated by the rubbing of the parts against one another, their deformation, or even their breakage. A solution of this type is described in patent application EP 1640564 in the name of the present applicant. In this solution, destruction means are mounted on a fixed impeller adjacent to an impeller of the turbine that is to be braked, and are designed to shear the legs from the rotor blades upstream as the rotor begins to move in the downstream direction.

This solution, although effective, leads to significant repair costs because of the damage caused to the blading.

SUMMARY OF THE INVENTION

The present invention is oriented toward a simple, effective and inexpensive solution for reducing the rotational speed, in a gas turbine engine, of a turbine comprising a rotor driving a shaft and capable of rotating inside a stator in the event of said shaft breaking.

According to the invention, the braking device is a device which comprises a first braking member provided with at least one abrasive element and a second braking member comprising a ring-shaped element made of a material capable of being eroded by the abrasive element, the two braking members being secured one of them to the rotor and the other to the stator and coming into contact with one another through axial displacement of the rotor once the shaft has broken, the abrasive element of the first braking member eroding the ring-shaped element of the second braking member.

The solution of the invention therefore consists in dissipating the energy of the rotor between two members which are designed specifically to afford braking. These means allow an increase in the contact area in accordance with the desired objective and provide a high coefficient of friction.

The advantage is also that the maximum speed that the rotor has to withstand without shattering can be reduced. This speed is the speed liable to be reached when the shaft breaks.

As a preference, the first braking member is secured to the stator and the second braking member is secured to the rotor; more specifically, with the rotor comprising at least one disk with a rim, the second member is secured to the rim and the first member is secured to the stator downstream of the rim. By positioning the braking members outside of the fan flow duct, the blades are spared and the region in which this dissipation of energy occurs can be localized.

For an engine comprising an exhaust casing, the second member is advantageously secured to the last turbine stage of the rotor and the first member is advantageously secured to the exhaust casing.

According to one embodiment, the first braking member comprises a plurality of abrasive elements distributed about the axis of the engine. The abrasive elements consist of abrasive granules attached, for example by sintering, to a fabric, for example a fiberglass fabric, impregnated with a resin that is resistant to high temperatures.

The invention also relates to a twin spool gas turbine engine with a low-pressure turbine section in which said section is equipped with a braking device such as this.

BRIEF DESCRIPTION OF THE DRAWINGS

Other features and advantages will emerge from the description of a nonlimiting embodiment of the invention with reference to the drawings in which.

DESCRIPTION OF THE PREFERRED EMBODIMENT

Figure 1:
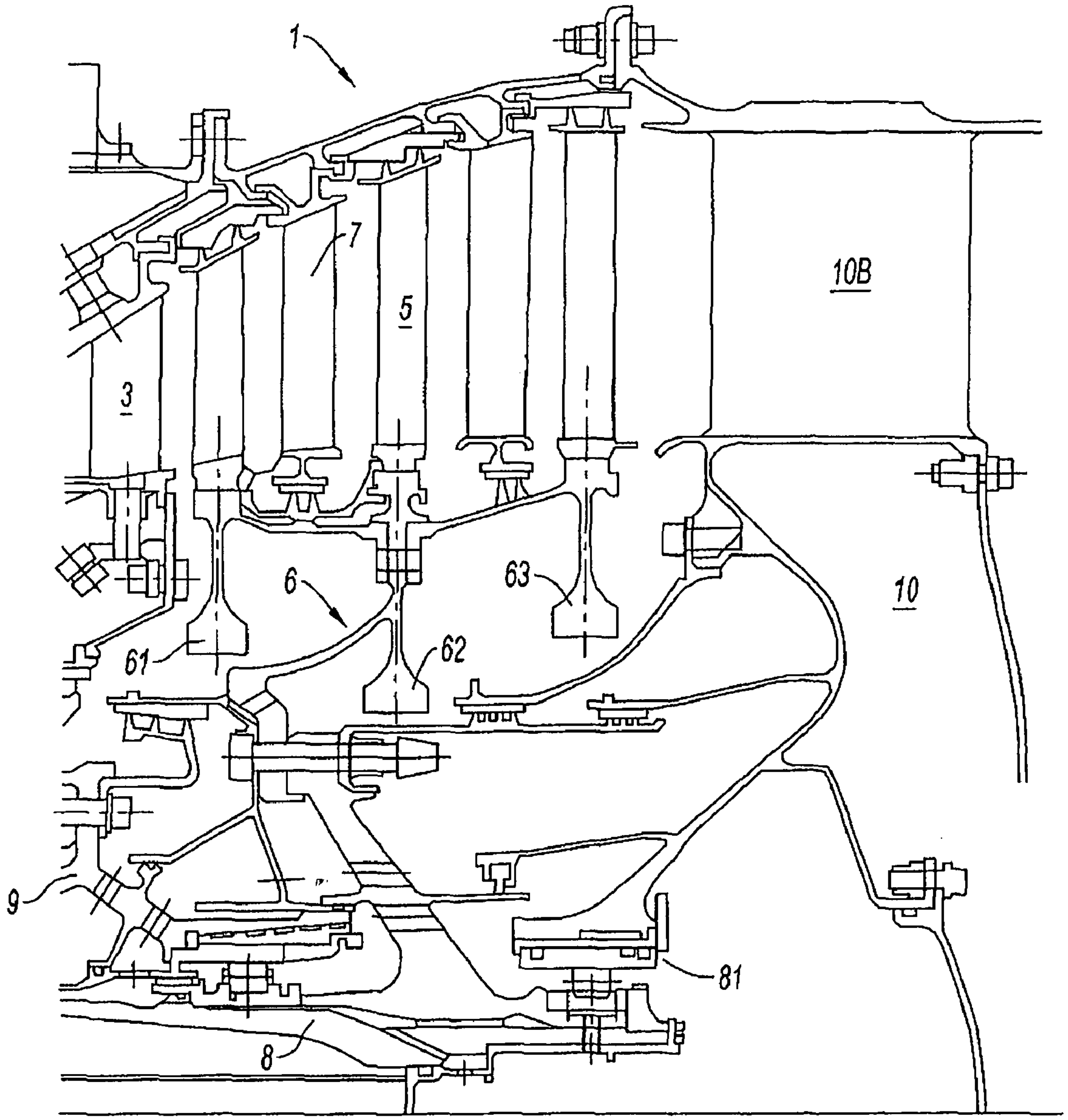
FIG. 1 shows an axial half section of the turbine section of a twin spool gas turbine engine.

FIG. 1 shows part of the turbine section 1 of a gas turbine engine. In a twin spool bypass engine, the turbine section 1 comprises an upstream high-pressure turbine, not visible in the figure, which receives the hot gases from the combustion chamber. The gases, having passed through the blading of the high-pressure turbine impeller, are directed through a set of fixed guide vanes 3, on to the low-pressure turbine section 5. This section 5 is made of a rotor 6 here in the form of a drum from an assembly of several bladed disks 61, 62, 63, in this example three bladed disks. The blades, which comprise a vane and a root, are mounted, generally individually, at the periphery of the disks in housings made in the rim. Sets of fixed guide vanes 7 are interposed between the turbine stages, each having the purpose of suitably directing the gas stream with respect to the moving blade downstream. This assembly forms the low-pressure turbine section 5. The rotor 6 of the low-pressure turbine is mounted on a shaft 8 concentric with the high-pressure shaft 9, which is extended axially toward the front of the engine where it is secured to the fan rotor. The rotor assembly is supported by appropriate bearings situated in the front and rear parts of the engine. FIG. 1 shows the shaft 8 supported by a bearing 81 in the structural casing, known as the exhaust casing 10. The exhaust casing is provided with means of attachment for mounting it to an aircraft.

When the shaft 8 accidentally breaks, the moving assembly of the low-pressure turbine shifts rearward, to the right in the figure, because of the pressure exerted by the gases. Furthermore, its rotation is accelerated because its resistive torque has disappeared and also because of the tangential thrust that the hot gases continue to exert on the moving blading as these gases pass through the turbine.

In order, according to the invention, to prevent the turbine from running away and to prevent its speed from reaching the maximum speed allowed before it shatters, a braking device is incorporated into the turbine section.

Figure 2:
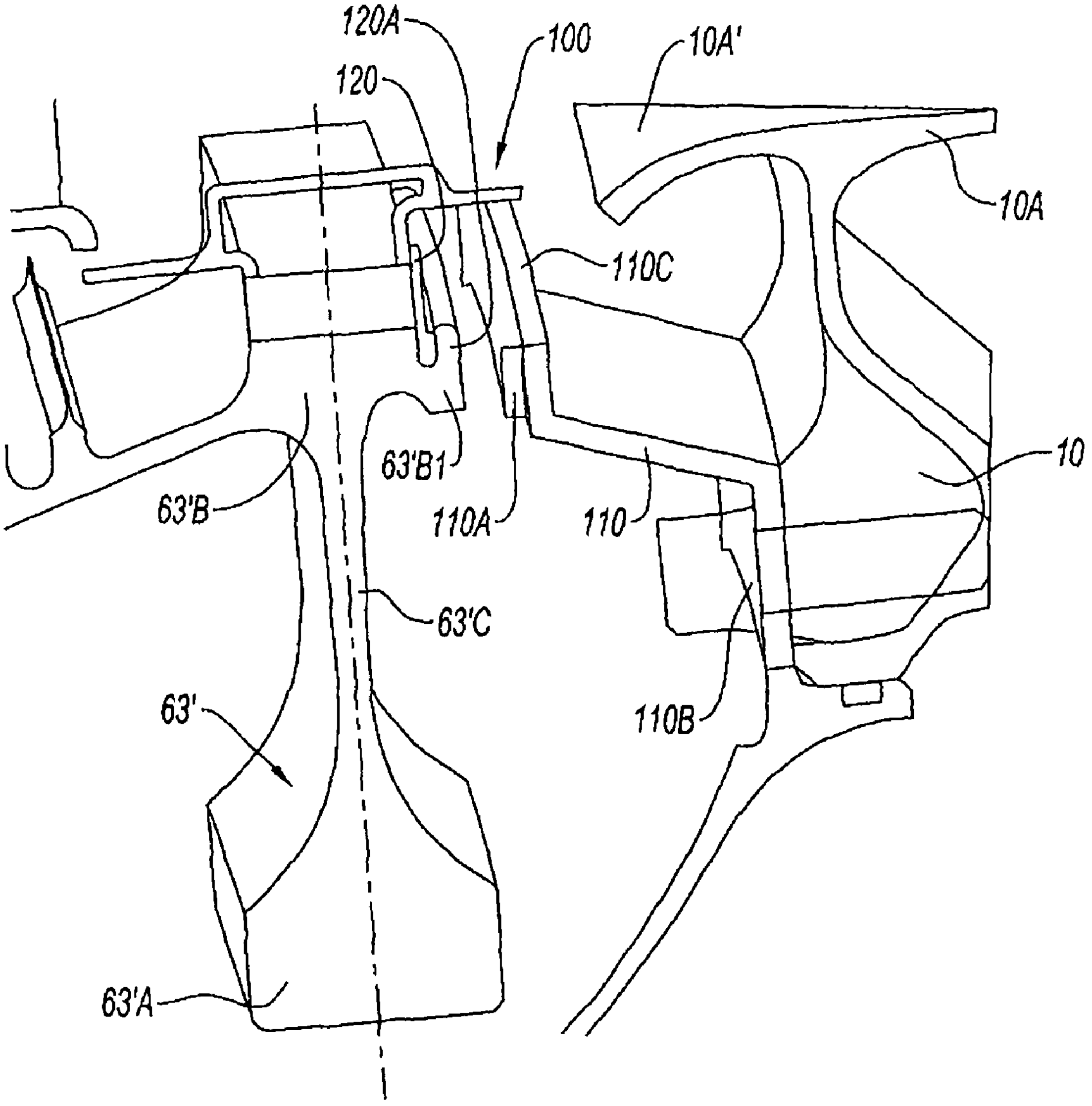
FIG. 2 shows a braking device formed on the low-pressure turbine section of the gas turbine engine.

This device 100 is depicted in FIG. 2 which is a partial perspective view of the turbine disk 63' and of the exhaust casing.

The disk 63' corresponds to the disk 63 in FIG. 1 modified according to the invention. The disk 63' has a conventional or some other form, in this example with a hub 63'A, a rim 63'B at its periphery and a thin radial web part 63'C between the hub and the rim. The rim 63'B is provided with means of attachment of the blades which extend in the radial direction into the annular passage through which the driving gases travel. The blades and their means of attachment do not form part of the invention and have not been depicted in their entirety in the figure, merely an outline in the plane of section being visible. The exhaust casing 10 is depicted in its part that faces the disk 63'. It comprises an annular platform 10A that forms the interior wall of the gas passage in the continuation of the platforms of the periphery of the disk 63' of the last turbine stage. Stator vanes 10B, not visible, extend radially into the annular passage. The platform 10A extends axially upstream toward the disk 63' in the form of an annular sealing tongue 10A'.

The braking device 100 of the invention is described hereinafter. It comprises a first braking member 110 which consists of abrasive elements 110A. The first braking member 110 is mounted on a stator support formed by the exhaust casing 10. The support comprises an annular flange 110D with a radial flange part 110B via which it is bolted to an annular rim of the casing 10 under the tongue 10A'. The flange 110D comprises a radial flange part 110C positioned downstream of the second braking member 120. The abrasive elements 110A are secured to the flange part 110C.

The second braking member 120 is secured to the rim 63'B. More specifically in this example, the member 120 is secured to a flange part 63'B1 downstream at the rim. It comprises a ring-shaped element with a radial surface 120A facing the abrasive element 110A.

This second braking member 120 may be added on to the flange part 63'B1 of the rim 63'B but may also be obtained by a machining operation from a casting at the same time as the rim. In this case, it is made of the same metal as the rim and has the hardness of the rim.

In normal operation, the turbine disk rotates about its axis and the braking member 120 travels in rotation about the engine axis, parallel to the front face of the abrasive element 110A of the braking member, preferably without touching it.

The combination of the elements 110A and 120A needs, when the disk shifts axially downstream because the shaft 8 has broken, to allow the abrasive elements 110A to rub against the surface 120A. The rotation associated with the pressure causes the braking member 120 to be worn away by the abrasive elements 110A in the manner of a conventional abrasive tool. The energy is supplied by the rotating rotor and is thus dissipated.

The structure and the materials of the abrasive elements 110A; granules, substrate are determined together and in conjunction with the material of the braking member 120.

The abrasive material may consist of abrasive granules like those known in industry. They may be grains of a ceramic material or of zirconium. These are fixed, for example by sintering, on to a substrate such as a fiberglass fabric impregnated with a resin capable of withstanding high temperatures. An epoxy resin of the Pyrotek F 51® type manufactured by Pyrotek is suited to this application and is able to withstand temperatures of up to 700° C.

The invention claimed is:

1. A braking device for, in a gas turbine engine, braking a turbine comprising a rotor driving a shaft and rotating with respect to a stator in the event of said shaft breaking, the braking device comprising:

a first braking member provided with at least one abrasive element, the abrasive element of the first braking member extending in a radial direction perpendicular to an axis of the engine and being secured to an upstream radial flange of a stator support formed by an exhaust casing; and a second braking member comprising a ring-shaped element made of a material capable of being eroded by the abrasive element, the second braking member extending in the radial direction and being secured to a flange of the rotor at a rim at an outer periphery of the rotor, the rim being provided with an attachment device which attaches blades to the rotor, the flange being disposed downstream of the attachment device and radially above a hub of the rotor and a web of the rotor which connects the hub to the rim, a thickness of the hub being greater than a thickness of the web in a direction parallel to the axis of the gas turbine engine, wherein the two braking members come into contact with one another through axial displacement of the rotor once the shaft has broken such that the abrasive element of the first braking member erodes the ring-shaped element of the second braking member which extends in the radial direction.

2. The device as claimed in claim 1, the engine comprising an exhaust casing, wherein the second braking member is secured to a last turbine stage of the rotor.

3. The device as claimed in claim 1, wherein the first braking member comprises a plurality of abrasive elements distributed about the axis of the engine.

4. The device as claimed in claim 1, wherein the abrasive element of the first braking member comprises abrasive granules mounted on a substrate.

5. The device as claimed in claim 4, wherein the substrate includes a fabric.

6. The device as claimed in claim 5, wherein the fabric is a resin-impregnated fiberglass fabric.

7. A twin spool gas turbine engine with a low-pressure turbine section, wherein said section is equipped with a braking device as claimed in claim 1.

8. The device as claimed in claim 1, wherein the stator support includes a downstream radial flange which is bolted to the exhaust casing and an annular flange which connects the upstream radial flange and the downstream radial flange.

9. The device as claimed in claim 2, wherein the first braking member comprises a plurality of abrasive elements distributed about the axis of the engine.

* * * * *